United States Patent [19]
Jacobovitz-Veselka et al.

[11] Patent Number: 5,457,568
[45] Date of Patent: Oct. 10, 1995

[54] 980 NM PUMPED ERBIUM FIBER AMPLIFIER

[75] Inventors: Gloria R. Jacobovitz-Veselka, Morganville; Kenneth L. Walker, New Providence, both of N.J.

[73] Assignee: AT&T Corp., Coral Gables, Fla.

[21] Appl. No.: 345,172

[22] Filed: Nov. 28, 1994

[51] Int. Cl.$^6$ ...................................................... H01S 3/00
[52] U.S. Cl. ........................................................ 359/341
[58] Field of Search ................................... 359/341, 343, 359/345; 385/42, 48; 372/6, 70

[56] References Cited

U.S. PATENT DOCUMENTS

| | | | |
|---|---|---|---|
| 5,283,686 | 2/1994 | Huber | 359/341 |
| 5,287,216 | 2/1994 | Chirravuri et al. | 359/341 |
| 5,311,606 | 5/1994 | Asakura et al. | 359/341 X |
| 5,327,282 | 7/1994 | Takeda et al. | 359/341 |
| 5,369,523 | 11/1994 | Millar et al. | 359/341 |

OTHER PUBLICATIONS

"Optical Fiber Amplifiers: Design & System Applications", Anders Bjarklev, Amtech House, Inc. Boston–London, 1993, p. 160.
Optics Letters, vol. 14, No. 15, Aug. 1, 1989, pp. 823–825.
"Fiber Optics Handbook" Christian Hentschel, Hewlett–Packard GmbH, Boeblingen Instrument Division, Federal Republic of Germany, Mar. 1989, pp. 45–49.
Technical Digest on Optical Amplifiers and Their Applications, (Optical Soc. of America) vol. 13, Paper WAI, (1990) pp. 206–209.

Primary Examiner—Mark Hellner
Attorney, Agent, or Firm—George S. Indig

[57] ABSTRACT

A 980 nm pump, for use with an erbium-doped fiber amplifier, provides redundancy together with simultaneous pumping, both co-propagating and counter-propagating, relative to 1550 nm signal, without need for an isolator.

7 Claims, 1 Drawing Sheet

980 NM PUMPED ERBIUM FIBER AMPLIFIER

FIELD OF THE INVENTION

Optical fiber communication systems.

TERMINOLOGY

Erbium Fiber Amplifier (EFA)—Amplifying apparatus including an erbium-doped fiber (EDF), and including pumping means and stabilizing elements. The term "EFA" is intended to be synonymous with "EDFA" (erbium-doped fiber amplifier).

Wavelength Division Multiplex (WDM)—Refers to closely-spaced multi-channel systems with channel wavelengths, encompassed within a permitted passband of an optical amplifier. In the instance of 1550 nm systems, an erbium fiber amplifier (EFA), with a passband of 1530 nm–1565 nm, is exemplary.

1550 nm—This is a nominal carrier wavelength value representative of any value within the wavelength band of 1530 nm–1565 nm. For WDM systems, it is the nominal center value for the individual channel wavelengths all of which fall within the specified band.

980 nm—This nominal value, descriptive of an absorption line of the EFA, is intended to include any wavelength effective for pumping over the corresponding absorption band (generally regarded as 976 nm±11 nm). The particular value selected depends on a number of factors known to the designer. The most effective center wavelength for the pump depends on the entire structure, rather than simply on the center absorption frequency of erbium itself.

DESCRIPTION OF RELATED ART

Pending U.S. application Ser. No. 08/178,142, filed Jan. 6, 1994 pending describes the state of the art. The erbium fiber amplifier together with low-insertion-loss fiber permits substantial distance between generators. Systems-in-installation provide for three 120 km amplified spans to result in a total of 360 km before optical-to-electrical conversion. It also provoked interest in closely-spaced WDM systems in which its passband is sufficient for simultaneous amplification of all channels.

Lasers, operating at a nominal wavelength of 1480 nm, have generally served for pumping the amplifier. Various arrangements provide for local as well as remote pumping, for pump redundancy, and for counter-propagating as well as co-propagating pump-signal. Choice as among these variations depend on system design and amplifier design.

Pumping at 980 nm—into a well-defined erbium absorption line—is generally preferable. The InGaAs strained quantum well laser permits the expected advantages of improved electrical-m-optical conversion and power saving.

The co-pending application addresses a further problem—practical unavailabifity of a 980 nm isolator to replace the Faraday rotation isolator used for stabilization at 1480 nm. Ser. No. 08/178,142 replaces the isolator with a stabilizing interference grating. Effectiveness is due to operation in "coherence collapse"—a regime of laser operation in which satellite emission increases pump power at the expense of narrow emission. Unacceptable for carder generation, pump use is tolerant of spectral broadening, while benefiting from increased power. The co-pending application teaches a further advantage—broadening yields a relatively featureless emission which is less susceptible to locking on spurious reflections.

SUMMARY OF THE INVENTION

A specific 980 nm pump design provides for simultaneous pumping of the erbium-doped fiber in both co-propagating and counter-propagating directions. Tandem stabilization for two or more lasers, pumping a particular amplifier, is provided by a stabilizing grating, usefully operating in the "coherence collapse" regime in accordance with co-pending U.S. patent application Ser. No. 08/178,142, filed Jan. 6, 1994. Simultaneous co- and counter-propagating redundancy is permitted by incorporation of an attenuation filter. This filter element prevents buildup of longer wavelength pump emission which otherwise may reach threshold and cause mode hopping.

The inventive solution is effective for any arrangement providing simultaneous co-propagating and counter-propagating pumping. While it is useful in circuits using a single pump laser, it is effective for any number of lasers. With the value placed on redundancy, a preferred embodiment of the invention contemplates at least two lasers.

Together with the invention of the co-pending application, a full selection of amplifier designs becomes attainable without need for a 980 nm isolator.

DETAILED DESCRIPTION

The Circuit

Figure 1:
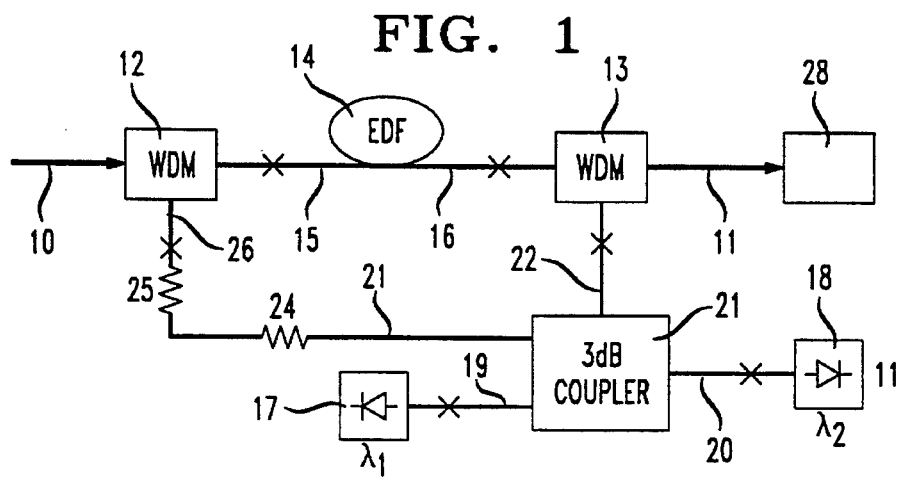
FIG. 1 is a circuit diagram of an optical fiber communication system including a 980 nm-pumped erbium fiber amplifier containing an attenuation filter and other required features of the invention.

The arrangement of FIG. 1 is illustrative. A pump circuit is contained within incoming waveguide 10 and outgoing waveguide 11. Elements 12 and 13 route pump and signal energy—with multiplexing or de-multiplexing as needed. These elements are generally described as "WDM" devices, but in this description are referred to as "signal/pump routers". (The term "WDM" is reserved for multiple channel operation—generally of closely-spaced wavelengths to permit simultaneous amplification by a single EFA.) A single erbium-doped fiber (EDF) 14 is shown connected with routers 12 and 13 by waveguides 15 and 16. Two laser pumps 17 and 18 are connected through guides 19 and 20 and outputs are combined by 2×2 coupler 21. Coupled output is directly connected to pump input port 23 of router 13 through guide 22, and coupler 21 is connected to pump input port 26 of router 12 through stabilizing grating 24 and attenuation filter 25.

The FIG. 1 pump circuit is preferred—partly for fundamental reason; partly for expediency. The desire for redundancy does suggest use of at least two lasers—a greater number may strike a better balance between pump and EDF capacity. Similarly, circuits may provide for two or more EDFs. The order of grating 24 and attenuator 25 may be reversed—either offers the convenience of combining with each other as well as with another element, without splicing losses. Operationally, there continues to be a preference for placing the grating on the co-propagating side of the pump, to assure some minimal pumping to maximize signal-to-noise ratio on the input side. In the usual arrangement, with significantly greater power available, it is desirable to introduce the greater amount of pump energy at the output side.

The fundamental advance will be readily appreciated. The attenuating filter supplies the loss mechanism, not offered by the EDF, so that unwanted emission is not permitted to build during successive passages. Most serious danger is presented by wavelengths within the 990 nm–1040 nm spectrum, and the filter attenuates, generally by at least 3 dB, over this spectrum.

From this fundamental standpoint, the filter is equally useful wherever positioned in the loop (in FIG. 1, the loop is described by the output side of coupler 21, and including the 980 nm sides of routers 12 and 13, together with EDF 14. Other variations may provide for three or more lasers, e.g. by provision of a coupler with a larger number of inputs, etc.

Component Design

The attenuation filter is critical to the invention. Precise characteristics are dependent upon other values—laser design, grating design, etc. Its purpose is to prevent buildup of spurious emissions to threshold (lasing) values. The tendency is for emission to drift to longer wavelength. This instability is favored by buildup of emission which passes through the EDF without significant absorption. Properly designed, the filter attenuates emission in the unwanted spectrum on the long wavelength side of the 980 nm erbium absorption line. Provision of at least 3 dB of attenuation on the long wavelength side of the grating reflectivity spectrum of 980 nm±15 nm, e.g. as measured at 1.05 nm, is suitable. Under most conditions, wavelengths greater than about 1018 nm do not reach threshold so that attenuation beyond that wavelength—while inherent in some filter structures—is unnecessary.

Filter attenuation may depend on bulk material absorption properties. Pending U.S. application Ser. No. 08/220,866, filed Mar. 31, 1994, describes a suitable filter structure. It is a long-period fiber grating which extracts unwanted energy by coupling from a guided core mode to forward-propagating cladding modes.

Signal/pump routers combine or separate signal and pump energy. A typical EDF emission band is 1530 nm–1565 nm, and this is suitable for nominal 1550 nm systems. The relevant erbium absorption band—the pump spectrum provided for by the grating is typically 966 nm–987 nm (for the nominal 980 nm absorption line). Separation of 60 dB between emission and absorption is readily available in commercial routers.

Routers are described in "Optical Fiber Amplifiers: Design & System Applications", Anders Bjarklev, Amtech House, Inc. Boston-London, 1993, p. 160.

The stabilizing grating is described in detail in co-pending U.S. application Ser. No. 08/178,142. Briefly, it is there contemplated that, for pump use, it is unnecessary to stabilize to the extent needed for communication use. Accordingly, the grating may have a lesser reflectivity—the lesser number of periods required for the relatively-broad emission described as resulting from operation in "coherence collapse". There are advantages to this arrangement. As described in the co-pending application, the broadened, featureless emission lessens the likelihood of wavelength-locking on spurious reflections. Further it better suits the present needs in permitting some considerable transmission through the grating to effectively pump the EDF. For the arrangements shown in FIG. 1, in which grating-transmitted pump energy is in the co-propagating direction, amplitudes permitted with reflectivities of from 1% to 25% are generally adequate for assuring needed signal-to-noise ratio at the fiber input.

Grating stabilization is essentially independent of the inventive advance. While operating in coherence collapse is generally desirable, it is not necessary for purposes of the invention. Final design for assured operation in coherence collapse must take other factors into account. Factors include the various unstabilizing influences introduced by the circuit and conditions of operation.

Prototype grating structures are commonly produced by interference of coherent beams in germanium-doped silica fiber. See, *OPTICS LETTERS* vol. 14, No. 15, Aug, 1, 1989, pp. 823–825. Procedures for replication of gratings with phase masks are also known. See, A 20,000 line structure with half wavelength spacing (0.3μ 0.4 μm), was used in the examples. Lines may be separated by multiple half-wavelength spacings, e.g. spacings up to several micrometers—such structures are described as "short period gratings". Longer period gratings are readily constructed and may be used.

The gratings used in the examples had a reflectivity of 9.6% (for the resulting 980 nm emission spectrum). A broad range of reflectivity values—as low as 1%—is operative. This range is bounded at one end by the minimum reflectivity needed for frequency locking. The maximum is not critical and is chosen to satisfy design requirements. For the arrangement shown in FIG. 1, a reflectivity as high as 97% left sufficient co-propagating pump powers to assure a signal-to-noise ratio adequate for low signal amplification.

The Coupler, serving to couple multiple pump inputs and outputs is conventional. Commercial devices providing for 2×2 coupling and higher are regularly available. Efficiency of commercial couplers is excellent, so that a 2×2 device may be considered a 3 dB coupler for practical purposes.

Coupler designs are discussed in "Fiber Optic Handbook" Christian Hentschel, Hewlett-Packard GmbH, Boeblingen Instrument Division, Federal Republic of Germany, March 1989, pp. 45–49.

The laser—a suitable InGaAs strained quantum well laser is described in *Technical Digest on Optical Amplifiers and Their Applications,* (Optical Soc. of America) vol. 13, Paper WA1, (1990) pp. 206–209. Typical structures have output facet reflectivity values of 0.20% to 10%, and have outputs of 60 mw to 100 mw.

EXAMPLES

Example 1—Amplifier spectra were measured for co-propagating and counter-propagating directions using the circuit of FIG. 1. Element characteristics were:

EDF—50 m length of 210 ppm erbium-doped silica fiber; 1530 nm–1565 nm emission band; 966 nm–987 nm absorption band.

Attenuation Filter—4 dB at 1005 nm–1012 nm; 0.2 dB at 966 nm–987 nm

Grating—9.6% reflectivity over the band, 978.2 nm±0.06 nm; 20,000 lines w/ ½ λ, separation.

Routers 60 dB separation between signal and pump (spectra satisfying the emission and absorption bands of the EDF).

Operating with laser outputs centered at 978 nm and 977 nm, output power of 16.82 dB and noise of 4.5 dB were achieved with co-propagating pump power of 15.05 dBm and counter-propagating pump power of 16.82 dBm. Input signal power was −14 dBm at signal wavelength of 1555 nm.

Figure 2:
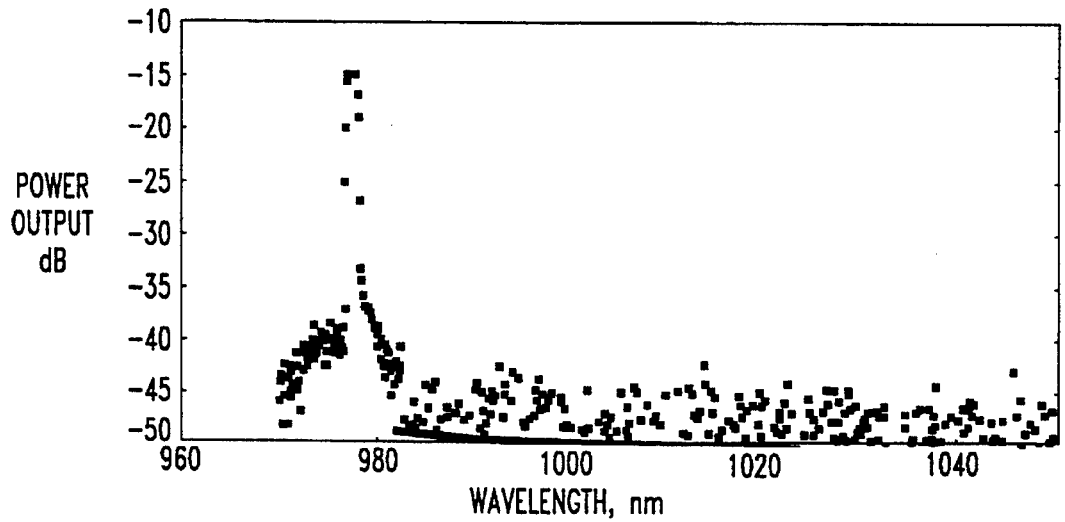
FIG. 2, on coordinates of output power and wavelength, is an amplifier emission spectrum for operation of the circuit of FIG. 1.

FIG. 2 shows the pump spectrum as measured at the co-propagating input port of the input coupler. Measurement was made with an optical spectrum analyzer, with measured points at 0.12 nm intervals. Operation was stable, with no evidence of laser-hopping.

EXAMPLE 2

Figure 3:
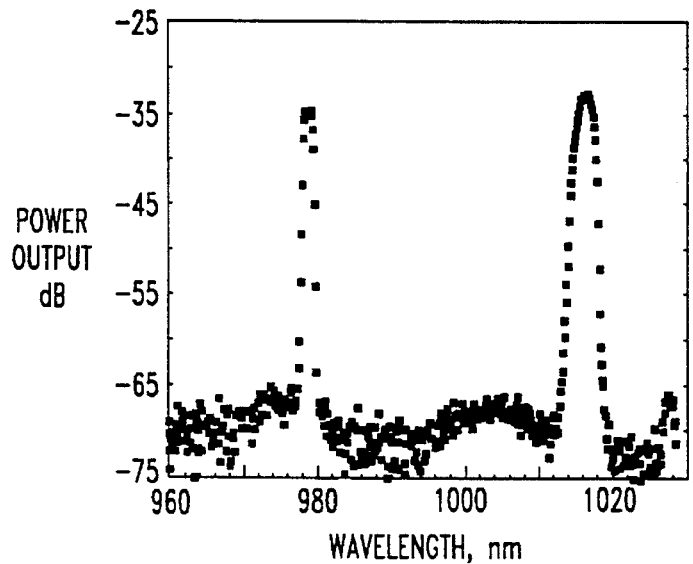
FIG. 3, on the same coordinates, shows the same operation for the FIG. 1 circuit but omitting the attenuation filter.
Figure 1:
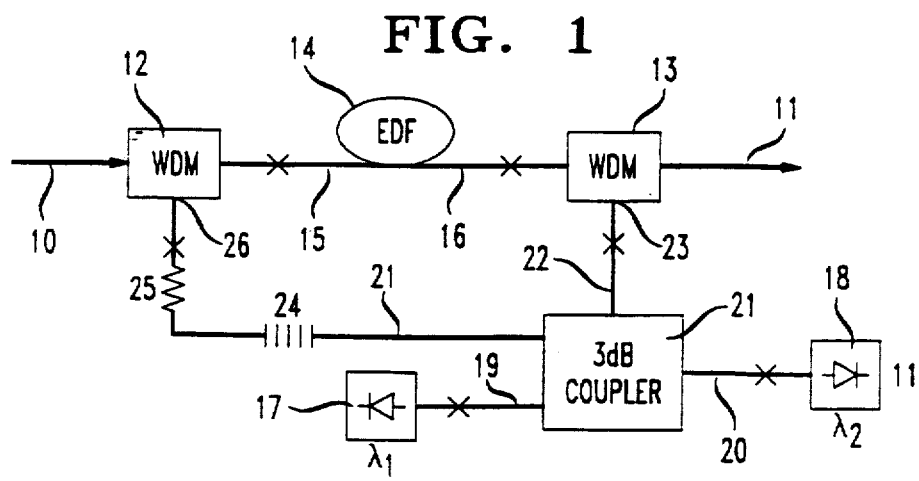
Figure 2:
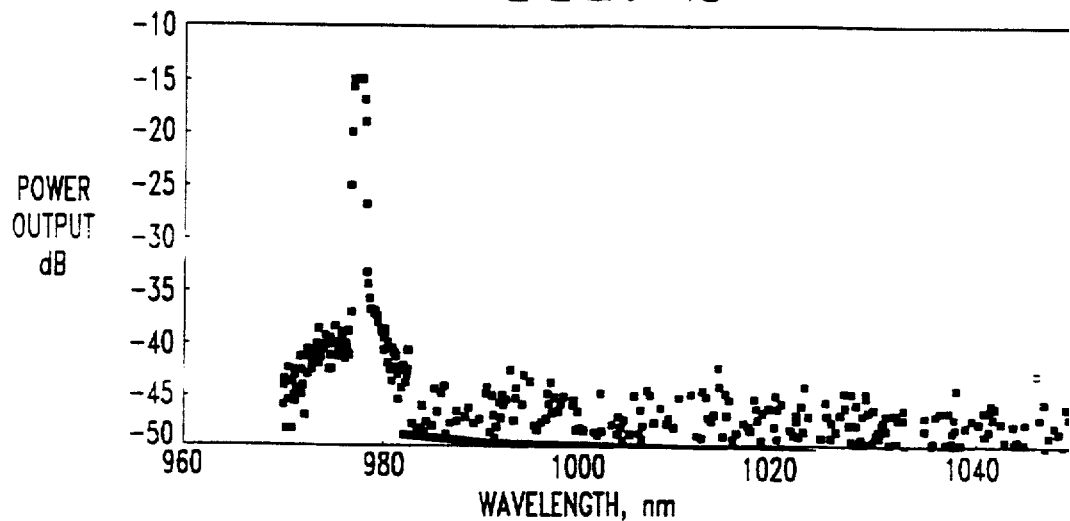
Figure 3:
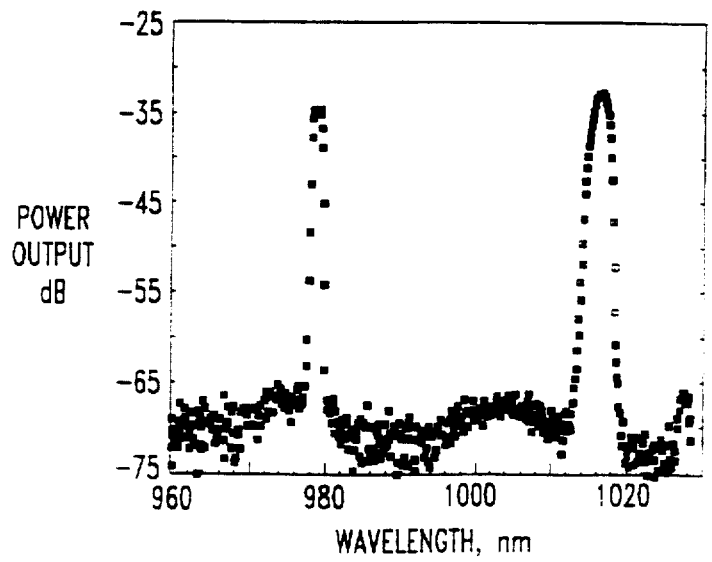

Example 1 was repeated without the attenuating filter. The pump spectrum measured in the same position and under the same conditions is shown in FIG. 3. Operation was unstable. The "snapshot" for the particular moment at which this spectrum was measured showed a spurious resonance at 1016 nm.

Other design considerations are essentially unaffected by the invention. State-of-the-art lasers may deliver 60 mw–100 mw of power. Future developments may increase this range. Facet reflectivity—ordinarily within the range of 0.2%–10%—assures appropriate threshold value.

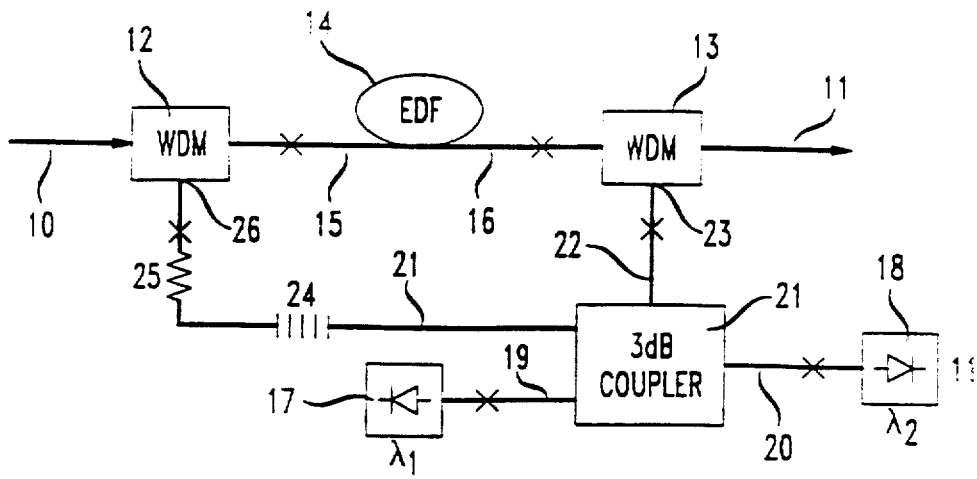

We claim:

1. Apparatus comprising an erbium-doped fiber amplifier including at least one erbium-doped fiber for amplifying a signal comprising modulated carrier of nominal 1550 nm wavelength, the amplifier including pump means operating at nominal wavelength of 980 nm for introducing energy into a corresponding absorption line of the erbium-doped fiber, the pump means comprising a laser and being provided with a stabilizing fiber grating in series arrangement with the laser, CHARACTERIZED IN THAT the pump means provides for simultaneous pumping in both co-propagating and counter-propagating directions relative to the signal transmission direction, thereby forming a pump loop, in that the loop includes an attenuating filter in series arrangement, and in which the filter attenuates at a wavelength within the wavelength range of 990 nm–1040 nm.

2. Apparatus of claim 1 in which the stabilizing fiber grating induces laser operation in the coherence collapse regime.

3. Apparatus of claim 1 in which the pump means includes at least 2 lasers coupled for tandem operation.

4. Apparatus of claim 1 in which the signal to be amplified consists essentially of at least one modulated carrier within the carrier spectrum of 1530 nm– 1565 nm.

5. Apparatus of claim 1 in which the signal consists essentially of a plurality of modulated carriers within the carrier spectrum.

6. Apparatus of claim 1 in which the loop includes an erbium-doped fiber between a first router for multiplexing signal and pump energy, and a second router for de-multiplexing signal and pump energy, the grating and filter being interposed between the pump and the first router.

7. Apparatus of claim 4 in which the order of grating and filter is from pump to coupler.

* * * * *

UNITED STATES PATENT AND TRADEMARK OFFICE
CERTIFICATE OF CORRECTION

PATENT NO.: 5,457,568

DATED: Oct. 10, 1995

INVENTOR(S): Gloria R. Jacobovitz-Veselka and Kenneth L. Walker

It is certified that error appears in the above-identified patent and that said Letters Patent is hereby corrected as shown below:

The title page, showing an illustrative figure, should be and substitute therefor the attached title page.

Column 1, line 39, "pending" should be deleted.

Column 1, line 57, "electrical-m-optical" should read --electrical-to-optical--.

Column 1, line 65, "carder" should read --carrier--.

Signed and Sealed this

Fifth Day of March, 1996

BRUCE LEHMAN

*Attest:*

*Attesting Officer*

*Commissioner of Patents and Trademarks*

United States Patent
Jacobovitz-Veselka et al.

Patent Number: 5,457,568
Date of Patent: Oct. 10, 1995

[54] 980 NM PUMPED ERBIUM FIBER AMPLIFIER

[75] Inventors: Gloria R. Jacobovitz-Veselka, Morganville; Kenneth L. Walker, New Providence, both of N.J.

[73] Assignee: AT&T Corp., Coral Gables, Fla.

[21] Appl. No.: 345,172

[22] Filed: Nov. 28, 1994

[51] Int. Cl.⁶ .................................................. H01S 3/00
[52] U.S. Cl. .......................................................... 359/341
[58] Field of Search ................................. 359/341, 343, 359/345; 385/42, 48; 372/6, 70

[56] References Cited

U.S. PATENT DOCUMENTS

| | | | |
|---|---|---|---|
| 5,283,686 | 2/1994 | Huber | 359/341 |
| 5,287,216 | 2/1994 | Chirravuri et al. | 359/341 |
| 5,311,606 | 5/1994 | Asakura et al. | 359/341 X |
| 5,327,282 | 7/1994 | Takeda et al. | 359/341 |
| 5,369,523 | 11/1994 | Millar et al. | 359/341 |

OTHER PUBLICATIONS

"Optical Fiber Amplifiers: Design & System Applications", Anders Bjarklev, Amtech House, Inc. Boston-London, 1993, p. 160.
*Optics Letters,* vol. 14, No. 15, Aug. 1, 1989, pp. 823–825.
"Fiber Optics Handbook" Christian Hentschel, Hewlett-Packard GmbH, Boeblingen Instrument Division, Federal Republic of Germany, Mar. 1989, pp. 45–49.
*Technical Digest on Optical Amplifiers and Their Applications,* (Optical Soc. of America) vol. 13, Paper WA1, (1990) pp. 206–209.

*Primary Examiner*—Mark Hellner
*Attorney, Agent, or Firm*—George S. Indig

[57] ABSTRACT

A 980 nm pump, for use with an erbium-doped fiber amplifier, provides redundancy together with simultaneous pumping, both co-propagating and counter-propagating, relative to 1550 nm signal, without need for an isolator.

7 Claims, 1 Drawing Sheet